June 5, 1962
I. GONETZ
3,038,045
FLUID LEAK DETECTORS
Filed March 8, 1960
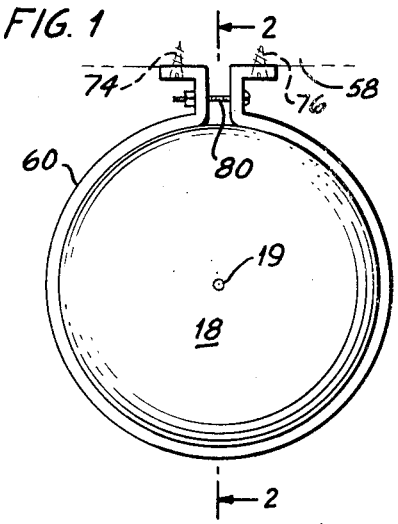
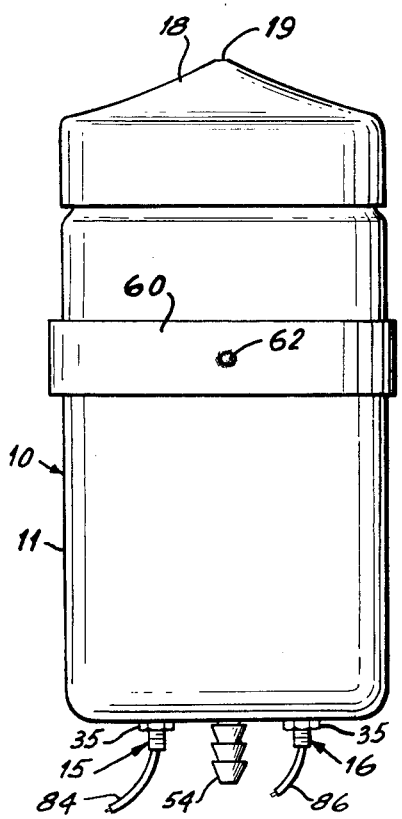
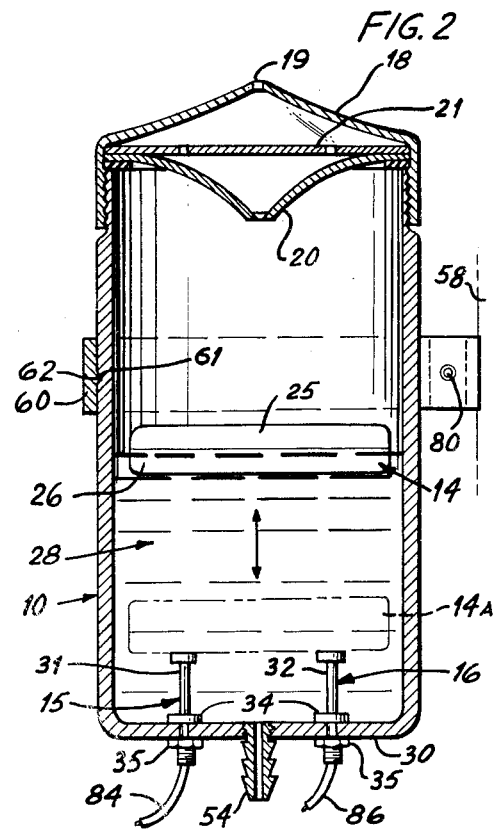
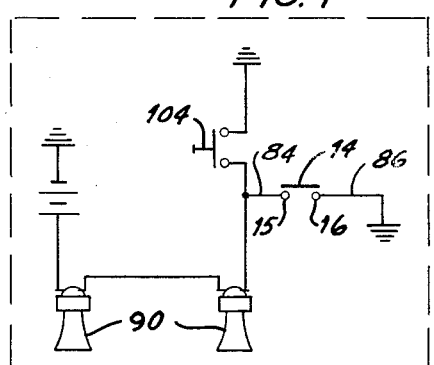
INVENTOR.
*IRVING GONETZ*
BY *Kleinberg & Lilling*
ATTORNEYS

United States Patent Office 3,038,045
Patented June 5, 1962

3,038,045
FLUID LEAK DETECTORS
Irving Gonetz, 2055 Ocean Ave., Brooklyn, N.Y.
Filed Mar. 8, 1960, Ser. No. 13,459
3 Claims. (Cl. 200—84)

The invention here presented is an improvement over my issued Patent Number 2,903,532 and is broadly in the field of leak detectors for hydraulic systems and more specifically it presents a device to automatically signal and thereby call the attention of the operator of a vehicle to a loss of fluid in the brake hydraulic system.

It is common in vehicles such as automobiles, trucks, and buses to provide a hydraulically operated brake system. The special brake fluid is supplied to the system through a master cylinder. The system is generally complex and is provided with numerous fittings, seals and packing glands, so that inherently it must have leaks after extended use. Furthermore, the brake fluid is usually a light viscous fluid which is capable of leaking past a seal in minute quantities, thereby remaining undetected.

If the loss of fluid is not called to the attention of the operator, the brake system may suddenly become inoperative and result in disaster.

While hydraulic fluid leak detectors are well known, their construction has been complicated by the incorporation of switches which may easily go out of order because of constant use and by expensive alarm indicators.

It is a primary object of this invention, therefore, to provide a float actuated brake leak detector which is simple and economical in construction, and which is comprised of relatively few parts. It thus could be sold for a fraction of more intricate and more expensive leak detectors, making it available to not only new cars and trucks but to the older vehicles on the road.

It is another object of this invention to provide a device which will indicate a low hydraulic fluid supply which does not pass electrical current unless and until the fluid supply is low.

Still another object is to provide a leak detector which may be easily installed or removed.

A further object is to provide a device which will conveniently allow the operator to visually check the level of the brake hydraulic fluid without removing any plugs, adapters or similar parts.

With these objects in view, the invention consists of the novel features of construction and arrangement of parts which will appear in the following specification and recited in the appended claims, references being had to the accompanying drawings in which the same reference numerals indicate the same parts throughout the various figures, in which:

FIGURE 1 is a top plan view of the invention; and

FIGURE 2 is a side view taken substantially along line 22 of FIGURE 1; and

FIGURE 3 is a front elevational view of the device; and

FIGURE 4 is a diagrammatic view of the electrical circuit.

I have illustrated generally a hydraulic brake leak detector 10 consisting primarily of a cylindrical vertically extending body portion 11 with one large opening 12 at its top, a float 14, contact points 15 and 16, and a top cover 18.

The top cover 18 may be secured to the cylinder 11 by threads or the like. The cylinder 11 is preferably constructed of a transparent material. It will thus be apparent that the interior of the device can be visually observed to determine the level of the hydraulic brake fluid therewithin.

The metallic top or cover 18 is provided at its center with a relatively small opening 19. This is to allow the free passage of air into the center of cylinder 11. As illustrated most clearly in FIGURE 2 secondary baffles 20 and 21 may also be installed in the top 18 to permit the free passage of air and to prevent the hydraulic fluid within the cylinder 11 from splashing out.

When desired the top 18 may be removed from cylinder 11 and hydraulic fluid may be poured through the resulting top opening 12 to fill this device and the brake system master cylinder (not illustrated) with fluid.

Located within the hollow cylinder 11, and of slightly smaller dimensions thereof, is the hollow float 14 fabricated of a conductive material and comprised of an upper half 25 and a lower half 26 secured together into one unitary construction. The float 14 is free to move vertically within the cylinder 11 and thereby always floats on the top surface of the hydraulic fluid 28 within the device.

Integrally fastened through the bottom surface 30 of cylinder 11 are two metallic contacts 31 and 32. The metallic contacts 31 and 32 are preferably fastened to bottom surface 30 by means of an upper flange 34 and a lower locking nut 35. Since the cylinder 11 is fabricated from a non-conductive material there is no electrical connection between contacts 31 and 32 and the remainder of the device unless and until float 14 is allowed to depress and make physical contact with the top surfaces of metallic contacts 31 and 32 as illustrated most clearly in phantom at 14A in FIGURE 2. Lead wires 84 and 86 are fastened by any suitable means to the lower or external portions of contacts 31 and 32.

The bottom surface 14 is provided with a nipple 54 to receive a flexible hose leading to the master cylinder (not illustrated).

It is contemplated that this device will generally be fastened to the motor side of the vehicle firewall 58 as directly as possible above the master cylinder. It is further contemplated that the simple direct bracket arrangement illustrated in FIGURES 1 and 3 be utilized. This arrangement is comprised merely of a thin metal strip 60 surrounding its cylinder 11. As illustrated, the metal strip 60 is wrapped around the device and fastened to the firewall 58 by bolts 74 and 76. A bolt 80 may be provided passing through the ends of strip 60 and when torqued will tighten it to form a rigid clamp. To prevent the bracket from slipping an indentation 61 may be provided in the cylinder 11 with a matching projection 62 in the strip 60.

The mode of operation of the device then is as follows:

The top 18 is removed and hydraulic fluid is poured through opening 12 thereby filling the master cylinder and this device 10. The top 18 is then locked in place.

While the device 10 is substantially filled with liquid, the float will be elevated. The switch combination comprised of the float 14 and the metallic contacts 31 and 32 therefore will be in the "off" or no current position, so that the horn 90 can only be sounded by the horn button 104. However, when the hydraulic fluid level is low, the float 42 descends to the downward position, thereby touching metallic contacts 31 and 32 completing the horn circuit and causing the horn 90 to sound. This alerts the driver to the danger of a low hydraulic fluid supply.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

Having thus described my invention, and illustrated its use, what I claim as new, and desire to secure by Letters Patent is:

1. A hydraulic fluid brake leak detector attachable to any master brake cylinder comprising, a housing having an opening to receive hydraulic fluid and a cover releasably attached to said housing to substantially close said opening, said cover having at least one relatively small and central opening, said cover having intermediately disposed baffles, each of said baffles having at least one offset opening thereby allowing the free passage of air between the interior and the exterior of said housing while preventing the exit of fluid, said housing being electrically non-conductive, an electrically conductive float within said housing, said float being free to move vertically within the confines of said housing, two spaced electrical contacts in juxtaposition the bottom of said housing, said electrical contacts passing through said bottom in a leakproof manner and connected to an alarm circuit external of said housing, and hydraulic fluid inlet means disposed adjacent said bottom so that the level of the fluid in the brake hydraulic system will be reflected in said housing whereby when said level falls low said float will descend to said electrical contacts and complete the circuit thereby.

2. A hydraulic fluid brake leak detector attachable to any master brake cylinder comprising, a housing having an opening to receive hydraulic fluid and a cover releasably attached to said housing to substantially close said opening, said cover having at least one relatively small and central opening, said cover having intermediately disposed baffles, each of said baffles having at least one offset opening thereby allowing the free passage of air between the interior and the exterior of said housing while preventing the exit of fluid, said cover having a downward taper from said opening thereby preventing fluid from collecting thereon and flowing into said housing, said housing being electrically non-conductive, an electrically conductive float within said housing, said float being free to move vertically within the confines of said housing, two spaced electrical contacts in juxtaposition the bottom of said housing, said electrical contacts passing through said bottom in a leakproof manner and connected to an alarm circuit external of said housing, and hydraulic fluid inlet means disposed adjacent said bottom so that the level of the fluid in the brake hydraulic system will be reflected in said housing whereby when said level falls low said float will descend to said electrical contacts and complete the circuit thereby.

3. A device as described in claim 2, wherein said housing is constructed of a transparent material whereby the level of fluid therein may be visually observed.

References Cited in the file of this patent
UNITED STATES PATENTS

| | | |
|---|---|---|
| 1,560,318 | Reed | Nov. 3, 1925 |
| 1,925,633 | Gulick | Sept. 5, 1933 |
| 2,253,260 | Alcorn | Aug. 19, 1941 |
| 2,903,532 | Gonetz | Sept. 8, 1959 |